(No Model.)
C. E. SACKETT.
TILLING MACHINE.
No. 279,819. Patented June 19, 1883.
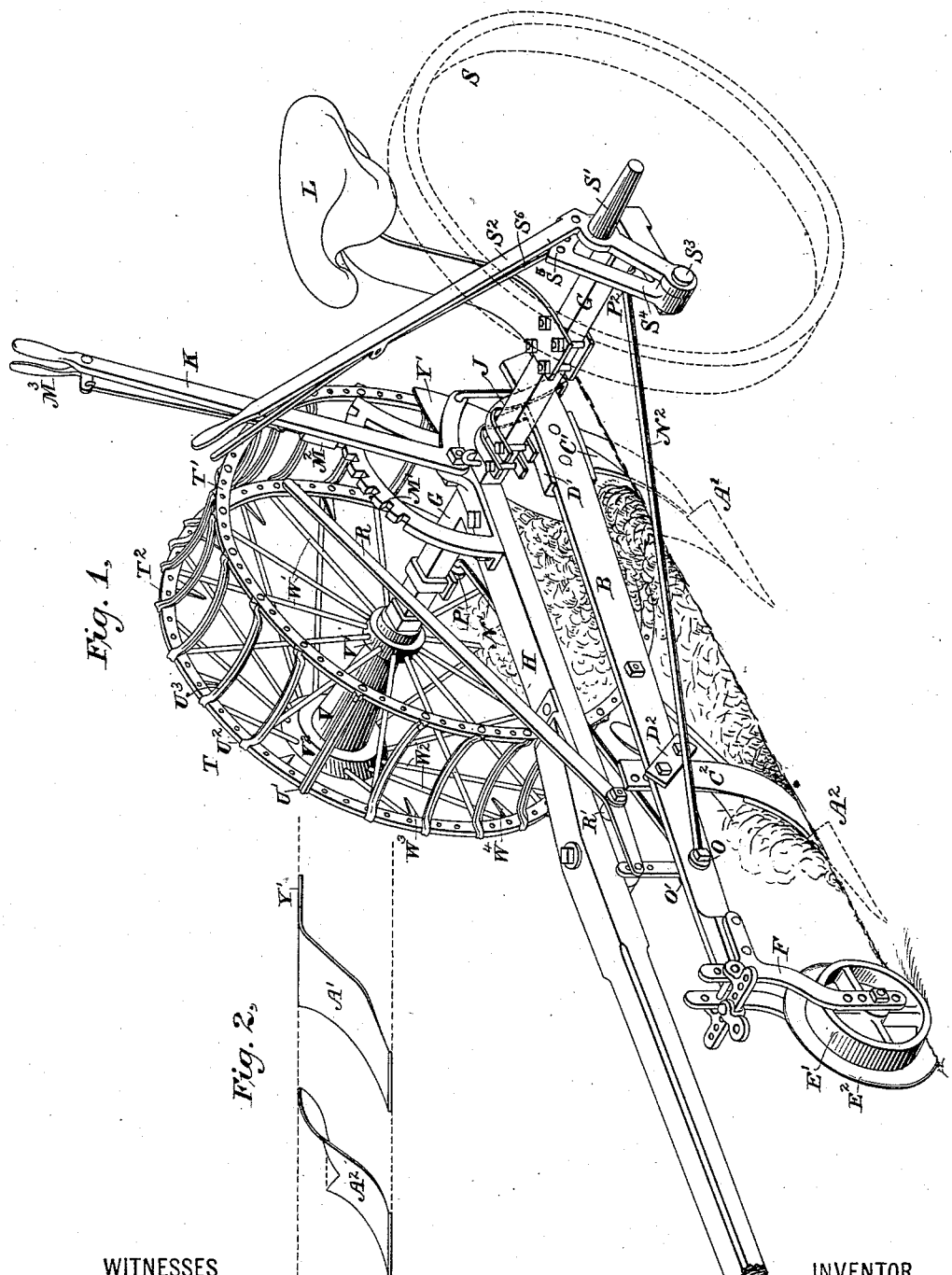
WITNESSES
Wm A. Skinkle
Geo W. Breck
By his Attorneys
Pope Edgcomb & Butler
INVENTOR
Charles E. Sackett,

UNITED STATES PATENT OFFICE.

CHARLES E. SACKETT, OF MORRISTOWN, NEW JERSEY.

TILLING-MACHINE.

SPECIFICATION forming part of Letters Patent No. 279,819, dated June 19, 1883.

Application filed February 5, 1883. (No model.)

*To all whom it may concern:*

Be it known that I, CHARLES EDGAR SACKETT, a citizen of the United States, residing in Morristown, in the county of Morris and State of New Jersey, have invented certain new and useful Improvements in Tilling-Machines, of which the following is a specification.

My invention relates to a class of tilling appliances which are designed to perform simultaneously the several operations involved in the preparation of the soil for seed.

The invention particularly relates to and constitutes an improvement upon the implement known as the "Combined Plow and Pulverizer," for which Letters Patent were granted to me at various dates since the 16th of December, 1879.

The object of this invention is to perfect each of the several processes executed by the implement—namely, clearing, reversing, plowing, aerating, and distributing the earth—and also to improve the construction of its component parts and the mode of their combination, so as to secure great strength with lightness of draft, lightness of weight, simplicity, and consequently cheapness of construction.

The special improvements herein set forth may be enumerated as follows:

First, to effect a complete reversal of the top layer of sods, weeds, &c., removed by the forward plow, I make the forward plowshare narrower than the rear plowshare, so as to leave a narrow uncut strip upon the edge of the furrow, which strip acts as a hinge upon which the layer turns under the action of a mold-board of appropriate shape, the strip retaining its hold long enough to produce the complete reversal.

Second, I have modified the construction of the pulverizing-wheel or skeleton drum by giving to the transverse braces upon its circumference an inward curvature, so that in riding the inverted layer turned by the forward plow the pulverizer may sink as deep as possible into the furrow in which it travels.

Third, I also sharpen both the rims and transverse bars for the purpose of cutting up the inverted layer, and I improve the details of construction in various other ways.

The exact subject-matter claimed will be hereinafter designated.

In the accompanying drawings, Figure 1 is a perspective view of my perfected tilling-machine in operation. Fig. 2 is a plan diagram, showing the relative positions of the two plows and the widths of their respective cuts.

Referring to Fig. 1, the main plow A' and skim-plow A² are connected to the beam B by means of suitable braces or standards, C' C², and clamps D' D². The beam B is slightly inclined to the horizontal plane, the point of the beam being elevated above its rear end sufficiently to insure the requisite draft-pressure upon the gage-wheel E' and colter E², which are carried by mechanism F, susceptible of vertical adjustment. Availing myself of the clearing action of the forward plow, I make the beam B practically straight, and give to it the said inclination, so that the beam may be low at its junction with the rear plow-standard. The use of a beam provided with a curved throat is thus avoided. With a straight beam disposed in this manner the strain is exerted in the direction of the length of the beam, and accordingly its cross-section may be materially decreased.

The frame-work of the implement is composed of a straight transverse axle, G, and a tongue, H, extending parallel to the line of motion and connected to said axle at a point near its center. The plow-beam is pivotally suspended from this frame-work, and mechanisms are provided for preventing lateral movement of the beam, and for vertically adjusting either end thereof. Thus the rear end of the beam enters a guide-loop, J, depending from the axle G, within which loop it has free vertical motion. The same end may be brought to any required vertical position by means of the angle-lever K, which is placed in a convenient location to be manipulated by the right hand of the operator when seated upon the spring-seat L. In order to maintain the beam in such position, a registering device is provided, consisting of the notched segment-frame M', the stop M², and its withdrawing-handle M³. All lateral movements of the forward end of the beam are prevented by yoke-braces N' N², rigidly connected to the beam at O and O', and articulating with the axle in the pivotal bearings P' P², connected upon the axle G. The forward end of the beam is hung from the angle-lever R, pivoted at R' to the tongue H, which lever is also capable of adjustment by the right hand of the operator. By means of these levers the operator may vary the depth of cut made by either plow, or may lift both plows above the ground when he desires to turn or transport the implement.

The land-wheel S revolves upon its spindle S', which is carried by the angle-lever $S^2$. The latter is pivoted at $S^3$ to an elbow, $S^4$, upon the land end of the axle G. A segment, $S^5$, and registering-lever $S^6$, are also provided for securing the system when proper adjustment is reached. The lever $S^2$ is manipulated by the operator with his left hand. It enables him to keep the axle G and seat L in a horizontal and the plow in an upright position.

In order that the forward plow may invert its furrow-slice, or the top layer of sods, &c., which it removes from the surface, I make its plowshare somewhat narrower than that of the rear plow, so as to leave a narrow uncut strip upon the furrow edge, which acts as a hinge for said furrow-slice. I also give to the mold-board of said forward plow the requisite curved structure to effect a semi-revolution of said furrow-slice upon said hinge as it is delivered into the adjoining previously-made furrow. This operation will be understood by reference to Fig. 2, in which the plows A' and $A^2$ are shown in horizontal projection, and the boundaries of their respective cuts are indicated by dotted lines.

The pulverizing-wheel T revolves on the furrow end of the axle G. It travels, as hereinbefore explained, in the last of the series of furrows previously opened. It is made of such breadth as to approximately fit the furrow, the distance between the rims T' and $T^2$ being regulated accordingly. These rims are connected together by transverse braces U' $U^2$ $U^3$, &c. The braces are curved inwardly, as shown, so as to form a grooved periphery or tread, and the outer faces of the transverse braces, as well as the rims, if desired, are formed with sharp cutting-edges. As the wheel advances the rim T' serves to cut the sods, weeds, &c., from the land edge of the furrow in which it moves. The braces serve to press the same down to the bottom of the furrow and there to cut them transversely. Owing to the curvature of the braces, the rims of the wheel may be forced by the weight of the implement to the floor of the furrow, and the wheel is thus made to ride the deposits of the forward plow without being materially elevated. The wheel is constructed upon an elongated hub, V, provided with inner and outer boxes or collars, V' $V^2$. From each of these boxes a series of spokes, W' $W^2$, radiates. The spokes are of steel or iron, and are made as light as is consistent with requisite strength. Pointed or wedge-shape teeth $W^3$ $W^4$, &c., are provided, attached to the outer rim, for the purpose of breaking up and pulverizing the earth. The proper number, length, and position of said teeth to secure the best result in any particular case, and the shape and curvature of the transverse arms will depend upon the character of the soil worked by the implement.

I claim as my invention—

1. In a pulverizing-wheel, the combination, substantially as hereinbefore set forth, of the wheel-rims revolving in the furrow, and the curved transverse braces connecting said rims and forming a grooved tread, whereby said wheel, in riding the deposits within said furrow, is not materially elevated.

2. As an improvement in pulverizing-wheels designed to ride the deposits within a furrow, the sharp cutting-edges upon the rims and transverse braces of said wheel for the purpose of cutting the said deposits, substantially in the manner described.

3. In a skeleton pulverizing-wheel, the combination, substantially as hereinbefore set forth, of the long hub, the end boxes thereof, the series of spokes radiating from each box, the circular rims, and the curved transverse braces.

In testimony whereof I have hereunto subscribed my name this 31st day of January A. D. 1883.

CHARLES EDGAR SACKETT.

Witnesses:
DANIEL W. EDGECOMB,
HOWARD R. BUTLER.